Feb. 3. 1925.
1,525,064
C. H. BROWN
RECORD CHART FOR SHOE MEASUREMENTS
Filed Feb. 21, 1922
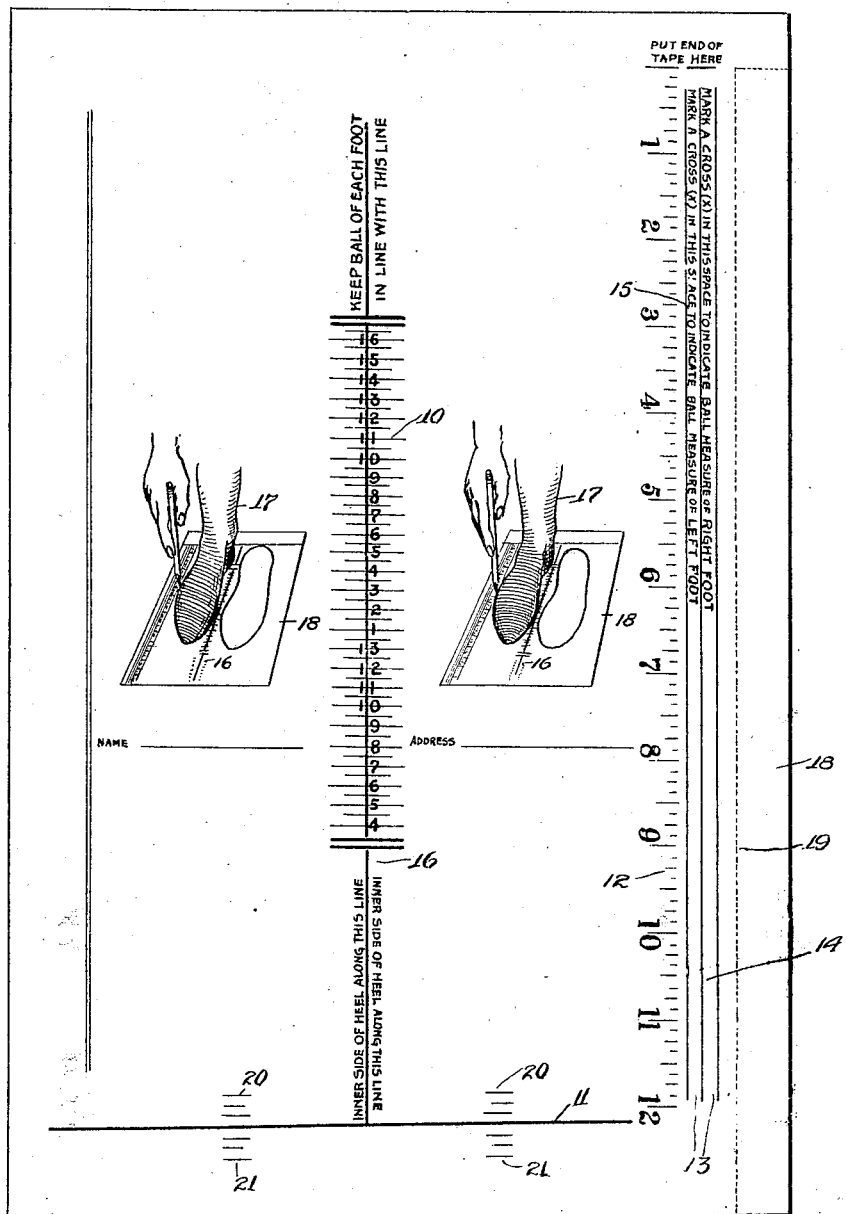

Patented Feb. 3, 1925.

1,525,064

UNITED STATES PATENT OFFICE.

CHARLES H. BROWN, OF FLUSHING, NEW YORK.

RECORD CHART FOR SHOE MEASUREMENTS.

Application filed February 21, 1922. Serial No. 538,384.

*To all whom it may concern:*

Be it known that I, CHARLES H. BROWN, a citizen of the United States, and a resident of Flushing, in the county of Queens and State of New York, have invented certain new and useful Improvements in Record Charts for Shoe Measurements, of which the following is a full, clear, and exact description.

This invention relates to measuring devices and particularly to charts used in making and recording foot measurements and shapes, assisting one in obtaining the correct sizes for shoes, and more especially when such record is self made to assist when the shoes are to be ordered by mail.

The object of the invention is to produce a chart which will provide for making the measurement of the foot from heel-to-ball which latter is absolutely essential to correct shoe-fitting, and which will have combined therewith a detachable strip that may be used with a scale on the chart to record the width of the feet.

One embodiment of the present invention is shown in the accompanying drawing, which represents a chart having markings thereon necessary in recording the dimensions of the feet to be fitted, a detachable strip being incorporated in said chart which can be used in conjunction with markings on the chart to properly record the width of feet.

Description.

As seen in the drawings, the chart which is made of paper is inscribed at its center with a longtudinally extending scale 10 which is arranged to begin a suitable distance from a heel line 11. Extending lengthwise of the chart and adjacent one edge thereof is another scale 12 which is paralleled at one side by spaces 13 that are formed by lines 14 and between which suitable notations are inscribed as at 15.

A center line 16 passing through the scale 10 terminates in the heel line 11. This center line 16 where it passes through the scale 10 forms a boundary in alinement with which the ball of the foot is placed when the process of outlining the foot on the chart is to take place, as is shown in the illustrations 17 inscribed on the chart. Suitable directions are printed adjacent the center line 16 for placing the various portions of the foot correctly in relation thereto when the outline is to be made. The heel of the foot will accordingly be in alinement with the heel line 11.

The center scale 10 is so arranged that the point at which the ball of the foot registers on the scale designates the length of the arch of the foot, which indicates the shoe required.

It has been found that when a person is tracing the outline of his own foot that the placement thereof on the chart is not accurate and is apt to be placed slightly forward or slightly back of the base line 11. I have placed the lines 20 and 21 at the forward and rearward sides of the line 11, to provide spaces equal to the spaces in the scale 10. This aids by showing that a certain number of spaces are to be added to or deducted from those indicated on the scale 10 to compensate for the mis-register of the traced outline and the line 11.

In order to determine the width of the foot there is provided a strip 18 which usually forms a side of the chart, and which is readily severed therefrom along the scored line 19.

The strip 18 is then drawn snugly around the ball of the foot until it overlaps, at which point a mark can be made thereon. The strip is then superposed on the scale 12, and a cross is placed in both of the spaces 13 in accord with the notations at 15 and successively for recording the measurement.

The strip 18 forming a part of the chart does away with the annoyance occasioned by transmitting separate strips through the mail, whch are liable to become misplaced and thereby delay the ordering of shoes.

Outlines are traced of both the right and left foot, said outlines being made in the spaces on opposite sides of the scale 10 and in accord with the chart as to right and left side thereof.

While the above described method of recording measurements and charts may be employed for use in connection with any manufacture of shoes, the chart is especially designed to facilitate the recording of measurements employed in the manufacture and selection of shoes known as arch preserver, or rigid arch shoes where the principal and essential measurement is the length of the base of the arch, or the distance of the joint of the great toe from the back of the heel.

When employing the chart for making a record in accordance with this system the person making the record marks with the pencil, or other instrument, on the scale 10, where the said joint of the great toe rests when tracing the outline. The calibrations of the scale 10 correspond with certain "last" measurements related to the manufacture of the said rigid arch shoes and more especially to the arch preserver shoes.

*Claims.*

1. A chart as characterized comprising a scale; and a tape-like detachable edge portion for use in conjunction with said scale to ascertain and record width measurements.

2. A chart as characterized comprising a scale on said chart; a portion of said chart rendered detachable therefrom, said portion forming a strip which may be passed around the foot and marked at its point of overlap; and said strip being adapted when laid out upon said scale to indicate the width of the foot.

3. A chart used in measuring the feet which has inscribed thereon, a plurality of scales, one of said scales being used for determining the lengths of the foot; and a strip detachable from said chart which can be used in conjunction with the other scale to determine the widths of the feet.

4. A chart as characterized having a calibrated scale for indicating length of a portion of the foot; a base line from which said calibrations are to be read; and a plurality of lines auxiliary to said base line and disposed in spaced parallel relation thereto for providing spaces equal to the spaces in said calibrations.

5. A chart as characterized comprising a calibrated scale for indicating the lengthwise measurements of portions of the human foot; a base line from which said calibrations are spaced; and means for correcting misregister of the foot with reference to said base line.

6. A chart as characterized comprising a calibrated scale for indicating the lengthwise measurements of portions of the human foot; a base line from which said calibrations are spaced; and means for indicating the misregister of the foot with reference to said base line, said means embodying spaced marks corresponding with the spaces in said calibrations.

7. In a chart as characterized, a sheet having a scale extended centrally of said sheet and forming blank spaces to either side thereof for the marking thereon of outlines whose length may be read directly from said scale, and a portion adapted to be detached from one edge of said sheet for use in conjunction with said scale whereby to measure the width of the said outlines.

8. In a chart as characterized, a sheet having a scale extended on the longitudinal center thereof and forming blank spaces to either side of the same for the marking thereon of outlines whose length may be read directly from said scale and a second scale extended parallel to one longitudinal edge of the sheet and inward of a plurality of blank spaces coextensive therewith, and a portion adapted to be detached from one of the longitudinal edges of said sheet for use in conjunction with said second scale whereby to measure the width of the said outlines, said blank spaces at the outer side of said second scale being adapted to have marked therein the ascertained width measurements of each of the outlines at the opposite sides of said first mentioned scale and at points therein directly opposite the corresponding scale indications located on the second scale.

CHARLES H. BROWN.